US011120313B2

(12) United States Patent
Singh et al.

(10) Patent No.: US 11,120,313 B2
(45) Date of Patent: Sep. 14, 2021

(54) GENERATING SEARCH DETERMINATIONS FOR ASSORTMENT PLANNING USING VISUAL SKETCHES

(71) Applicant: International Business Machines Corporation, Armonk, NY (US)

(72) Inventors: Raghavendra Singh, New Delhi (IN); Ayushi Dalmia, New Delhi (IN); Vikas C. Raykar, Bangalore (IN); Abhishek Bansal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 16/511,487

(22) Filed: Jul. 15, 2019

(65) Prior Publication Data

US 2021/0019579 A1    Jan. 21, 2021

(51) Int. Cl.
*G06K 9/00* (2006.01)
*G06K 9/66* (2006.01)
*G06K 9/44* (2006.01)
*G06N 3/04* (2006.01)
*G06K 9/62* (2006.01)
*G06K 9/46* (2006.01)

(52) U.S. Cl.
CPC ............. *G06K 9/66* (2013.01); *G06K 9/44* (2013.01); *G06K 9/4652* (2013.01); *G06K 9/6276* (2013.01); *G06N 3/04* (2013.01)

(58) Field of Classification Search
CPC ........................................................ G06K 9/66
See application file for complete search history.

(56) References Cited

U.S. PATENT DOCUMENTS

| 6,061,145 | A | * | 5/2000 | Kanda | G06K 15/02 |
| | | | | | 358/1.9 |
| 8,352,494 | B1 | * | 1/2013 | Badoiu | G06F 16/5838 |
| | | | | | 707/772 |
| 8,550,818 | B2 | * | 10/2013 | Fidaleo | G09B 19/00 |
| | | | | | 434/99 |
| 8,965,117 | B1 | * | 2/2015 | Rybakov | G06K 9/6267 |
| | | | | | 382/165 |
| 9,449,026 | B2 | | 9/2016 | Wang et al. | |
| 9,489,403 | B2 | | 11/2016 | Eskolin et al. | |

(Continued)

OTHER PUBLICATIONS

Chen et al., Sketch2Photo: Internet Image Montage, ACM Transactions on Graphics, vol. 28, No. 5, Article 124, Dec. 2009.

*Primary Examiner* — Hadi Akhavannik
(74) *Attorney, Agent, or Firm* — Ryan, Mason & Lewis, LLP

(57) ABSTRACT

Methods, systems, and computer program products for generating search determinations for assortment planning and buying using visual sketches are provided herein. A computer-implemented method includes processing a query image by identifying one or more visual features in the query image and applying at least one nearest neighbor algorithm to the one or more identified visual features; identifying, from one or more databases, multiple images based at least in part on the processing; generating a result set by applying one or more smoothing algorithms to the multiple identified images; generating at least one sketch based at least in part on the result set; and outputting the at least one generated sketch to one or more users via a user interface.

20 Claims, 5 Drawing Sheets

(56) References Cited

U.S. PATENT DOCUMENTS

| | | | |
|---|---|---|---|
| 9,684,858 B2 | 6/2017 | Aoki | |
| 2003/0095701 A1* | 5/2003 | Shum | G06T 11/00 382/155 |
| 2010/0254594 A1* | 10/2010 | Wang | G06T 11/00 382/155 |
| 2011/0231405 A1* | 9/2011 | Herbrich | G06F 16/24573 707/748 |
| 2013/0215116 A1* | 8/2013 | Siddique | G06Q 20/204 345/420 |
| 2014/0254933 A1* | 9/2014 | Jin | G06T 7/238 382/173 |
| 2015/0084853 A1* | 3/2015 | Li | G06F 3/03542 345/156 |
| 2015/0254843 A1* | 9/2015 | Brown | G06T 7/187 382/131 |
| 2017/0148226 A1* | 5/2017 | Zhang | G06T 9/00 |
| 2018/0005393 A1* | 1/2018 | Senthamil | G06T 7/80 |
| 2018/0232400 A1 | 8/2018 | Saavedra Rondo | |
| 2018/0322208 A1 | 11/2018 | Barrios Nunez et al. | |
| 2020/0073968 A1* | 3/2020 | Zhang | G06N 3/08 |

\* cited by examiner

GENERATING SEARCH DETERMINATIONS FOR ASSORTMENT PLANNING USING VISUAL SKETCHES

FIELD

The present application generally relates to information technology and, more particularly, to assortment planning techniques.

BACKGROUND

Assortment planning can include attempting to determine market demand for one or more products, attempting to determine if there are gaps in an assortment based on customer queries, attempting to determine a plan for an inventory to achieve maximum turnover, attempting to determine potential among products in an assortment, etc. Conventional assortment planning approaches include image retrieval techniques. However, such conventional approaches face challenges with respect to image accuracy and consistency, which can lead to inefficient results.

SUMMARY

In one embodiment of the present invention, techniques for generating search determinations for assortment planning using visual sketches are provided. An exemplary computer-implemented method can include processing a query image by identifying one or more visual features in the query image and applying at least one nearest neighbor algorithm to the one or more identified visual features, and identifying, from one or more databases, multiple images based at least in part on the processing. Such a method also includes generating a result set by applying one or more smoothing algorithms to the multiple identified images, generating at least one sketch based at least in part on the result set, and outputting the at least one generated sketch to one or more users via a user interface.

In another embodiment of the invention, an exemplary computer-implemented method can include processing a query image by identifying one or more visual features in the query image by applying one or more neural networks to the query image, and applying at least one nearest neighbor algorithm to the one or more identified visual features. Such a method also includes identifying, from one or more product image databases, multiple images based at least in part on the processing, generating a result set by applying one or more smoothing algorithms to the multiple identified images, and generating at least one sketch based at least in part on applying one or more deep learning techniques to the result set. Further, such a method includes outputting the at least one generated sketch to one or more users via a user interface, updating the at least one generated sketch based at least in part on one or more user-proposed modifications to the at least one generated sketch, and outputting the at least one updated sketch to one or more of the users via the user interface.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
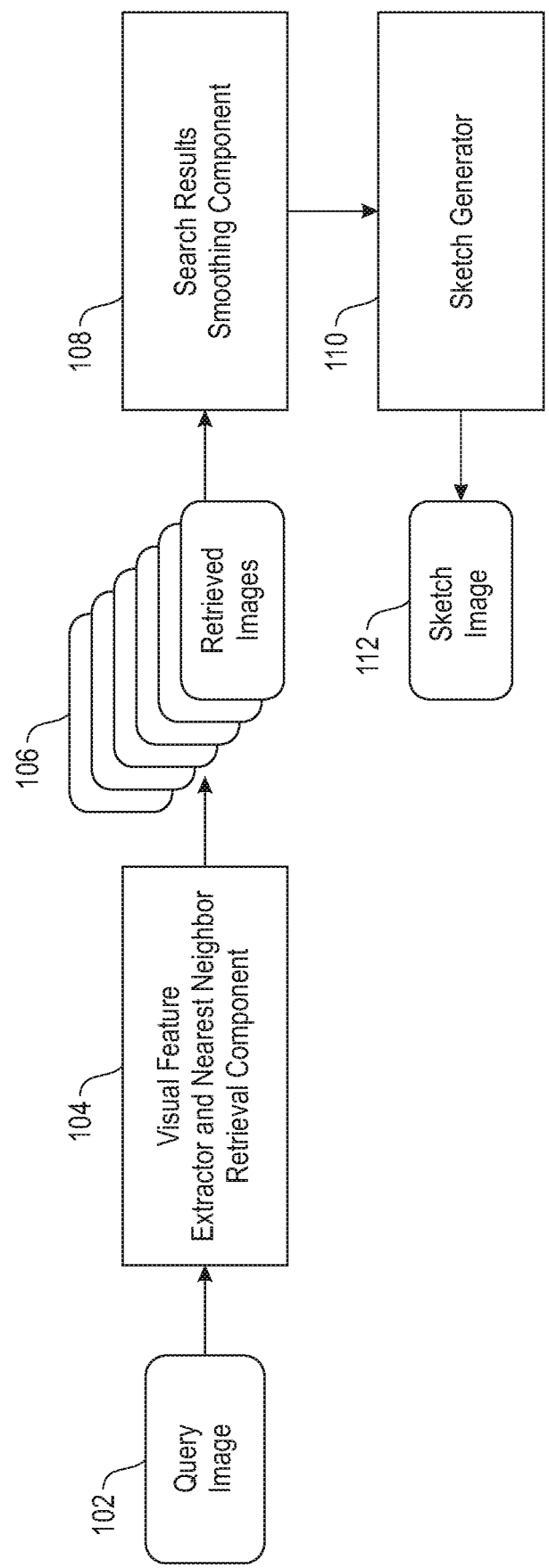
FIG. 1 is a diagram illustrating system architecture, according to an exemplary embodiment of the invention.

As described herein, an embodiment of the present invention includes generating search determinations for assortment planning and buying using visual sketches. At least one embodiment includes enhancing user experiences by generating sketches for image result sets by obtaining a visual feature vector for each query image and assisting a designer and/or other user to identify gaps in a catalog and/or visual search results. As used herein, for a given query and a catalog, its "sketch" is a representative image which represents the attributes of the nearest neighbors of the query with respect to the catalog. Such an embodiment includes generating a sketch for each result set (e.g., query images) by obtaining a visual feature vector for a query image and identifying nearest neighbors of the query image. The proposed representative sketch can capture, in one or more embodiments, an average over attribute information of the set of images and/or attributes of a smoothened result set.

Additionally, at least one embodiment includes determining one or more insights related to assortment planning using the sketches of the visual search results. Such an embodiment also includes analyzing the sketch of each result set and the query image together to assist a user (such as, for example, a retailer or company) in identifying one or more gaps between the query image and the result set.

Accordingly, and as further detailed herein, given a query image, one or more embodiments include generating a sketch of visual search results, and using the sketch to enhance the user experience and to facilitate identifying gaps in a product catalogue and/or the visual search results. By way merely of example, an e-commerce merchandise provider/seller would be interested in understanding the behavior of users and how the e-commerce platform is performing in serving these users. One important goal of such an e-commerce platform could include permitting users to search what they want. However, the catalog of the e-commerce platform may not contain every desired object of interest requested by the user. Additionally, it can be manually laborious to go through all user queries and corresponding search results. Accordingly, in one or more embodiments, by implementing sketches of search results, the e-commerce platform user can use such sketches alongside a query to take appropriate actions with respect to a catalog.

By generating a sketch of the image and/or visual search results, one or more embodiments can be implemented in the following example scenarios. As implemented, for example, in connection with merchandisers, buyer, online retailers, etc., visual search systems will only function efficiently if the underlying query catalogue has enough matching apparel for the user's interest. In such embodiments, analyzing the sketch of the results and the query image together will assist the merchandiser, buyer, online retailer, etc. in identifying the gap(s) between the query image and the result set. Additionally, as implemented, for example, in connection with designers, the representative sketch and/or image can be used as a basis to design newer silhouettes so that the new design is different from the set of results but does not drift and/or stray significantly from the core style of the designer for a given inspirational query.

Further, as implemented, for example, in connection with visual comparison shopping techniques, designers and consumers can perform comparison shopping to compare and contrast different catalogues. Instead of sifting through hundreds or thousands of images from the different catalogues, at least one embodiment includes facilitating a visual comparison shopping based at least in part on sketches for clustered images in each catalogue. Also, as implemented, for example, in connection with end users, if a user is interested in a particular silhouette, the query image may not represent that aspect. In at least one embodiment, by modifying the sketch of the image, the user is able to correctly query and therefore obtain correct search results. Additionally, using the sketch of the search result assists the user in starting with something more likely available in the catalogue.

One or more embodiments include determining one or more sets of images that are consistent across multiple attributes. Such an embodiment can include applying a nearest neighbor algorithm to a query image with respect to properties such as, for example, geometry, color, pattern, etc., and based at least in part of the application of the nearest neighbor algorithm, generating and/or identifying a sketch that is representative of the one or more sets of images. At least one embodiment includes generating a sketch that encompasses the mean, with respect to the noted properties of interest, of all of images in the one or more sets of images. Alternatively, in at least one embodiment, the sketch represents the closest point in the result set (that is, the one or more sets of images) to the query image.

FIG. 1 is a diagram illustrating system architecture, according to an embodiment of the invention. By way of illustration, FIG. 1 depicts a query image 102, which is processed by a visual feature extractor and nearest neighbor retrieval component 104. Such processing results in the identification of multiple retrieved images 106 (from one or more databases, catalogues, etc.). The retrieved images 106 are then processed by a search results smoothing component 108, which generates and provides an output to a sketch generator 110. In one or more embodiments, smoothing search results can include capturing only a subset of an entire search result, wherein the subset does not contain noise or outliers occurring due to incorrectness of the search algorithm. In such an embodiment, when the sketch is generated, only true matches of the query with the catalog are utilized to evaluate the catalog. Also, one or more embodiments include generating smoothing results by building nearest neighbor sets of the search result set based on various attributes of interest and removing ones which are singleton sets.

Referring again to FIG. 1, based upon the provided input(s), the sketch generator 110 generates and outputs a sketch image 112, as further described herein. In such an embodiment, the sketch images 112 represents the attributes of the smoothened result set (generated by smoothing component 108). Additionally, in one or more embodiments, the sketch image 112 can be constrained such that when used as a query, the sketch image returns the result set (that is, retrieved images 106).

In one or more embodiments, the visual feature extractor and nearest neighbor retrieval component 104 implements one or more models for obtaining one or more visual feature vectors for the query image 102. For example, such a model can include one or more convolutional neural networks and/or one or more residual neural networks. Additionally, in at least one embodiment, the visual feature extractor and nearest neighbor retrieval component 104 implements an approximate k-nearest neighbor method to determine the nearest neighbors (from among one or more sets of images) for the query image 102.

Also, in one or more embodiments, the sketch generator 110 implements entangled (i.e., deep learning) generation. For example, such an embodiment can include using a generative network (e.g., a deconvolution network) to generate an image using a feature vector (e.g., a particular feature of a particular convolutional neural network) that represents the statistics of the set of retrieved images 106. Such statistics can include, for example, one or more histograms, mean values, median values of image features such as color, pattern, shape, etc. Additionally, such an embodiment can further include utilizing Siamese loss to ensure that the result set is sufficiently close to and/or similar to the sketch. With respect to Siamese loss, a user can train a network by taking an anchor image and comparing the anchor image with both a positive sample and a negative sample. The dissimilarity between the anchor image and the positive image should be low, and the dissimilarity between the anchor image and the negative image should be high. Accordingly, one or more embodiments include using Siamese loss to train a model to generate a sketch such that the sketch is not very dissimilar from a corresponding result set.

Further, in one or more embodiments, the sketch generator 110 implements disentangled (e.g., with respect to shape, color, pattern, etc.) generation. By way of example, such an embodiment can include taking shape contours of all images in the result set (that is, retrieved images 106), and dilating and contracting the set of contours to form a sketch. Once the representative sketch is formed, the sketch may contain some noise, such as holes or gaps. Dilation and contraction can be applied in sequence to remove such noise. Specifically, dilation expands the connected sets of is in a binary image, whereas contraction shrinks them. If the retrieved images 106 are catalogue images, for example, the images will be mostly centered and registered. Such an embodiment can also include taking and/or determining statistics (e.g., histogram, mean, median, etc.) with respect to color and pattern for each pixel across all images in retrieved set of images 106. Using the statistics, such an embodiment fills and/or generates the color and pattern of the sketch image 112. In one or more embodiments, pattern plays a role because such a consideration may preclude color to change locally.

Also, such an embodiment can include implementing a projection of convex sets to ensure that the resulting set of images (that is, retrieved images 106) is close to and/or similar to the sketch image 112. When generating the sketch, it may so happen that the resultant sketch is different from the retrieved set of results. In order to avoid this, one or more embodiments include creating a convex set of images in the feature space and adding a constraint on the sketch generator 110 that the representation of the sketch lies within this convex region. This ensures that the generated sketch is similar to the retrieved results.

Figure 2:
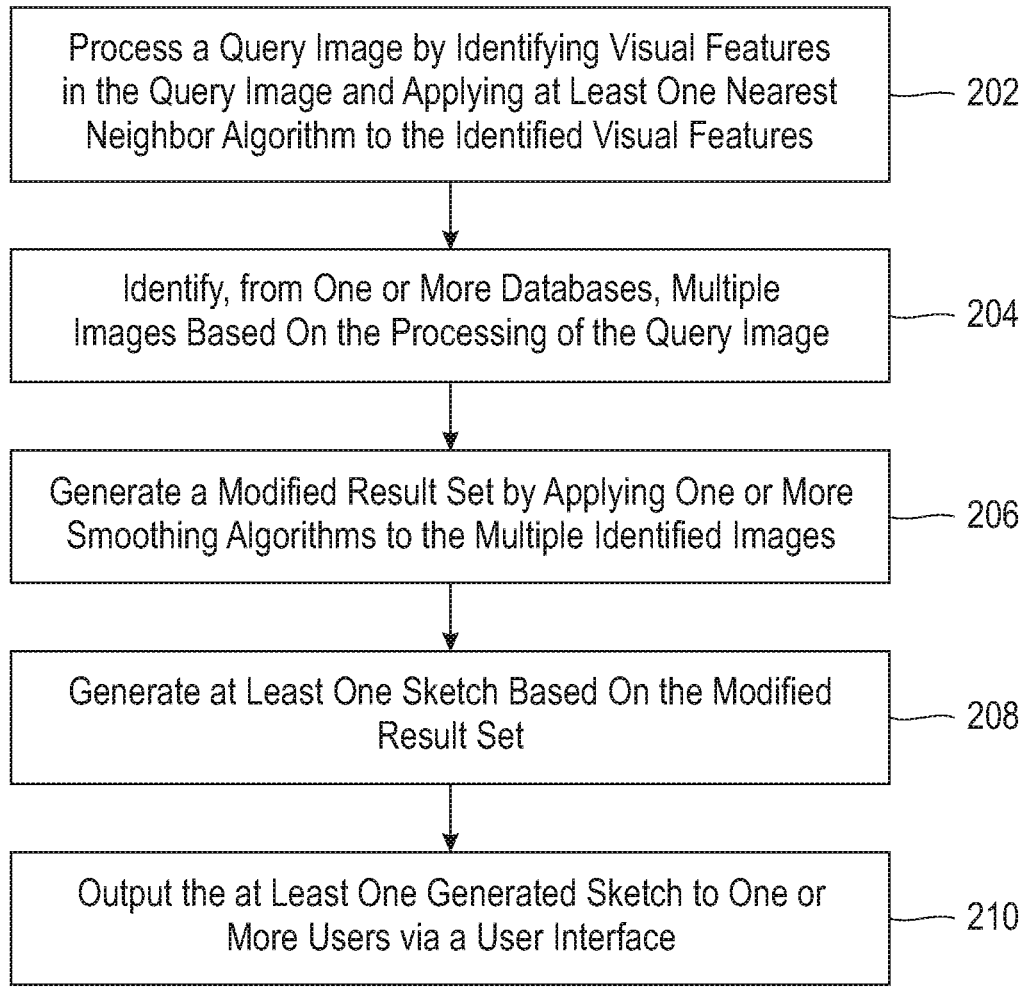
FIG. 2 is a flow diagram illustrating techniques according to an embodiment of the invention.

FIG. 2 is a flow diagram illustrating techniques according to an embodiment of the present invention. Step 202 includes processing a query image by (i) identifying one or more visual features in the query image and (ii) applying at least one nearest neighbor algorithm to the one or more identified visual features. Identifying one or more visual features in the query image can include applying one or more models to the query image. In one or more embodiments, the one or more models include one or more convolutional neural networks and/or one or more residual neural networks.

Step 204 includes identifying, from one or more databases, multiple images based at least in part on said processing. In at least one embodiment, the one or more databases include one or more product catalogues.

Step 206 includes generating a (modified) result set by applying one or more smoothing algorithms to the multiple identified images. Step 208 includes generating at least one sketch based at least in part on the (modified) result set. In one or more embodiments, applying one or more smoothing algorithms to the multiple identified images includes determining statistics with respect to color and pattern for each pixel across the multiple identified images. In such an embodiment, generating at least one sketch includes generating the color and pattern of the at least one sketch based at least in part on the determined statistics.

Additionally, in at least one embodiment, generating the at least one sketch includes implementing one or more deep learning techniques. Implementing the one or more deep learning techniques can include applying a generative network to the (modified) result set using at least one feature vector that comprises at least one statistic representative of the multiple identified images. In such an embodiment, the generative network can include a deconvolution network. Also, implementing the one or more deep learning techniques can include implementing a disentangled generation technique. In such an embodiment, implementing a disentangled generation technique can include identifying one or more shape contours of all images in the (modified) result set and dilating and contracting the one or more identified shape contours to generate the at least one sketch.

Further, in one or more embodiments, generating at least one sketch includes generating the at least one sketch based at least in part on one or more distance values with respect to the query image and the multiple identified images.

Step 210 includes outputting the at least one generated sketch to one or more users via a user interface.

Also, an additional embodiment of the invention includes processing a query image by identifying one or more visual features in the query image by applying one or more neural networks to the query image, and applying at least one nearest neighbor algorithm to the one or more identified visual features. Such an embodiment also includes identifying, from one or more product image databases, multiple images based at least in part on the processing, generating a (modified) result set by applying one or more smoothing algorithms to the multiple identified images, and generating at least one sketch based at least in part on applying one or more deep learning techniques to the (modified) result set. Further, such an embodiment includes outputting the at least one generated sketch to one or more users via a user interface, updating the at least one generated sketch based at least in part on one or more user-proposed modifications to the at least one generated sketch, and outputting the at least one updated sketch to one or more of the users via the user interface. Additionally, in such an embodiment, the one or more user-proposed modifications to the at least one generated sketch can include one or more modifications with respect to at least one of (i) at least one shape within the at least one generated sketch, (ii) at least one color within the at least one generated sketch, and (iii) at least one pattern within the at least one generated sketch.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
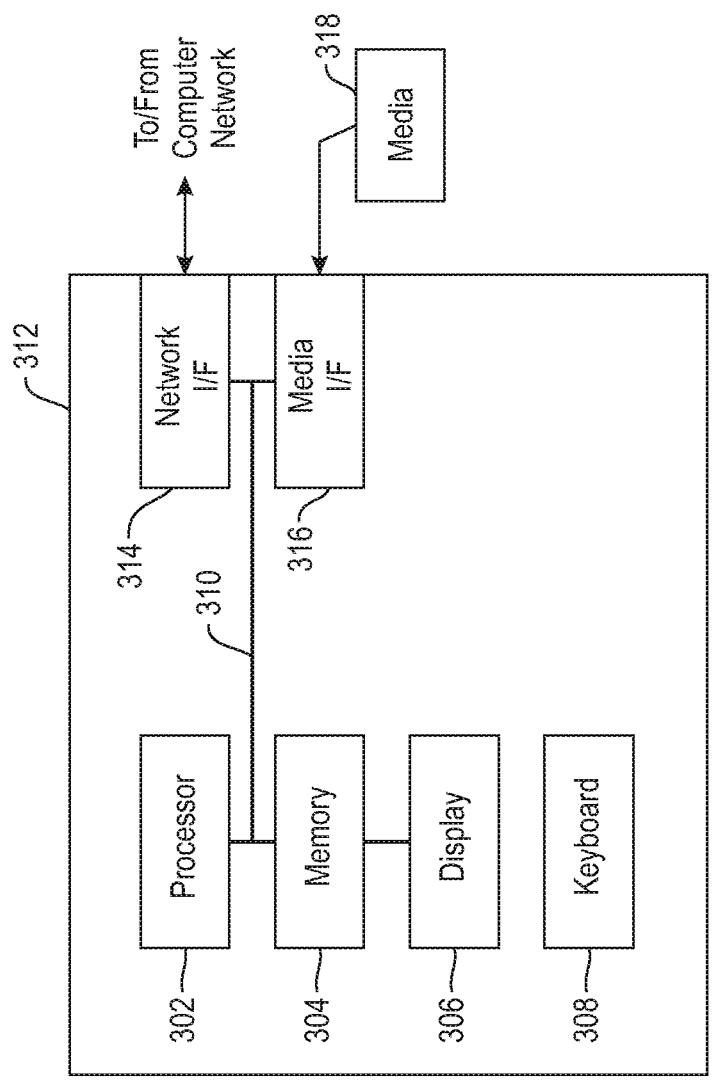
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
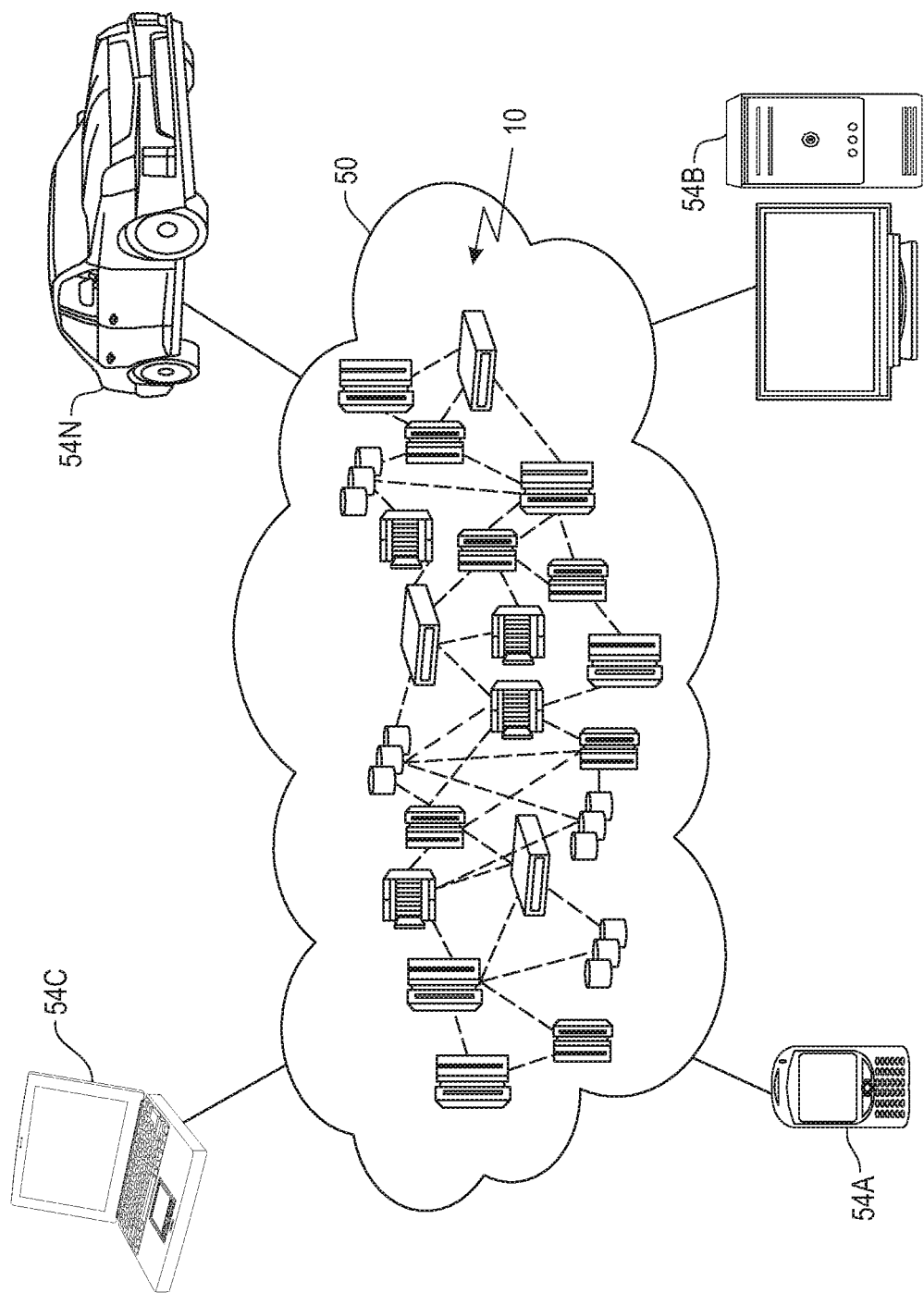
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
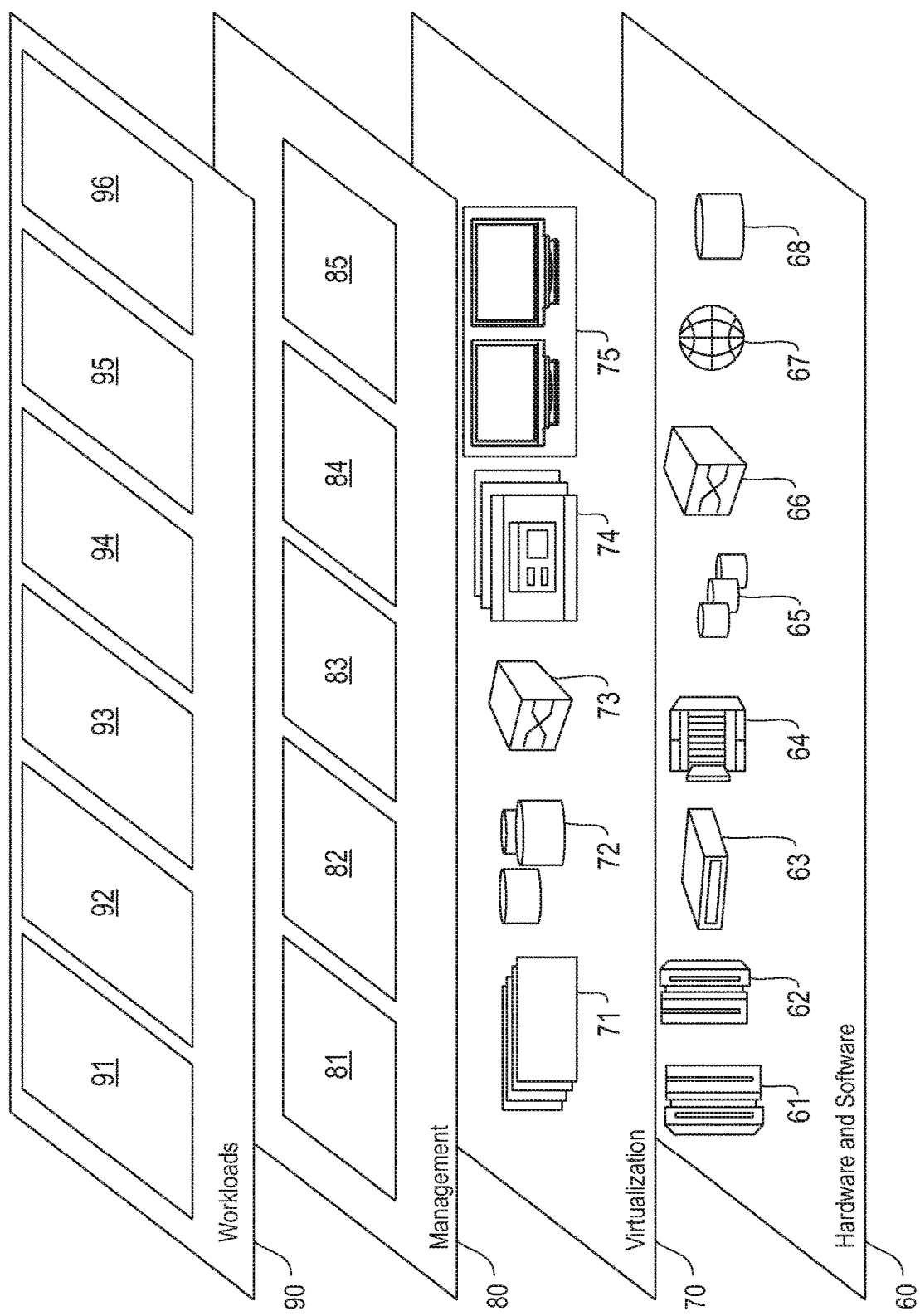
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assortment planning and buying using visual sketches 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, analyzing a sketch of each result set and query image together to assist a retailer in identifying gaps between the query image and the result set.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
   processing a query image by (i) identifying one or more visual features in the query image and (ii) applying at least one nearest neighbor algorithm to the one or more identified visual features;

identifying, from one or more databases, a set of multiple images based at least in part on said processing;

applying one or more smoothing algorithms to the multiple identified images, wherein the one or more smoothing algorithms remove at least one of the identified multiple images from the set;

generating a result set comprising the remaining identified images in the set;

generating a convex set of images corresponding to the result set;

generating at least one sketch based-at least in part on the result set and the convex set of images; and outputting the at least one generated sketch to one or more users via a user interface;

wherein the steps are carried out by at least one computing device.

2. The computer-implemented method of claim 1, wherein said identifying one or more visual features in the query image comprises applying one or more models to the query image.

3. The computer-implemented method of claim 2, wherein the one or more models comprise one or more convolutional neural networks.

4. The computer-implemented method of claim 2, wherein the one or more models comprise one or more residual neural networks.

5. The computer-implemented method of claim 1, wherein the one or more databases comprise one or more product catalogues.

6. The computer-implemented method of claim 1, wherein said applying one or more smoothing algorithms to the multiple identified images comprises determining statistics with respect to color and pattern for each pixel across the multiple identified images.

7. The computer-implemented method of claim 6, wherein said generating at least one sketch comprises generating the color and pattern of the at least one sketch, based at least in part on the determined statistics.

8. The computer-implemented method of claim 1, wherein said generating the at least one sketch comprises implementing one or more deep learning techniques.

9. The computer-implemented method of claim 8, wherein said implementing the one or more deep learning techniques comprises applying a generative network to the result set, using at least one feature vector that comprises at least one statistic representative of the multiple identified images.

10. The computer-implemented method of claim 9, wherein the generative network comprises a deconvolution network.

11. The computer-implemented method of claim 8, wherein said implementing the one or more deep learning techniques comprises implementing a disentangled generation technique.

12. The computer-implemented method of claim 11, wherein said implementing a disentangled generation technique comprises identifying one or more shape contours of all images in the result set and dilating and contracting the one or more identified shape contours to generate the at least one sketch.

13. The computer-implemented method of claim 1, wherein said generating at least one sketch comprises generating the at least one sketch based at least in part on one or more distance values with respect to the query image and the multiple identified images.

14. A computer program product comprising a computer readable storage medium having program instructions embodied therewith, the program instructions executable by a computing device to cause the computing device to:

process a query image by (i) identifying one or more visual features in the query image and (ii) applying at least one nearest neighbor algorithm to the one or more identified visual features;

identify, from one or more databases, a set of multiple images based at least in part on said processing;

apply one or more smoothing algorithms to the multiple identified images, wherein the one or more smoothing algorithms remove at least one of the identified multiple images from the set;

generate a result set comprising the remaining identified images in the set;

generate a convex set of images corresponding to the result set generate at least one sketch based at least in part on the result set and the convex set of images; and outputting the at least one generated sketch to one or more users via a user interface.

15. The computer program product of claim 14, wherein said identifying one or more visual features in the query image comprises applying one or more models to the query image, and wherein the one or more models comprise at least one of (i) one or more convolutional neural networks and (ii) one or more residual neural networks.

16. The computer program product of claim 14, wherein said applying one or more smoothing algorithms to the multiple identified images comprises determining statistics with respect to color and pattern for each pixel across the multiple identified images, and wherein said generating at least one sketch comprises generating the color and pattern of the at least one sketch based at least in part on the determined statistics.

17. The computer program product of claim 14, wherein said generating the at least one sketch comprises implementing one or more deep learning techniques, and wherein said implementing the one or more deep learning techniques comprises at least one of (i) applying a generative network to the result set using at least one feature vector that comprises at least one statistic representative of the multiple identified images and (ii) implementing a disentangled generation technique.

18. A system comprising:

a memory; and at least one processor operably coupled to the memory and configured for:

processing a query image by (i) identifying one or more visual features in the query image and (ii) applying at least one nearest neighbor algorithm to the one or more identified visual features;

identifying, from one or more databases, a set of multiple images based at least in part on said processing;

applying one or more smoothing algorithms to the multiple identified images, wherein the one or more smoothing algorithms remove at least one of the identified multiple images from the set;

generating a result set comprising the remaining identified images in the set;

generating a convex set of images corresponding to the result set generating at least one sketch based at least in part on the result set and the convex set of images; and outputting the at least one generated sketch to one or more users via a user interface.

19. A computer-implemented method, the method comprising steps of:

processing a query image by (i) identifying one or more visual features in the query image by applying one or more neural networks to the query image and (ii) applying at least one nearest neighbor algorithm to the one or more identified visual features;

identifying, from one or more product image databases, multiple images based at least in part on said processing;

applying one or more smoothing algorithms to the multiple identified images, wherein the one or more smoothing algorithms remove at least one of the identified multiple images from the set;

generating a result set comprising the remaining identified images in the set;

generating a convex set of images corresponding to the result set generating at least one sketch based at least in part on (i) one or more deep learning techniques applied to the result set and (ii) a constraint that a feature vector corresponding to the at least one generated sketch is within a convex region of a feature space corresponding to the convex set of images;

outputting the at least one generated sketch to one or more users via a user interface;

updating the at least one generated sketch based at least in part on one or more user-proposed modifications to the at least one generated sketch; and outputting the at least one updated sketch to one or more of the users via the user interface;

wherein the steps are carried out by at least one computing device.

20. The computer-implemented method of claim 19, wherein the one or more user-proposed modifications to the at least one generated sketch comprise one or more modifications with respect to at least one of (i) at least one shape within the at least one generated sketch, (ii) at least one color within the at least one generated sketch, and (iii) at least one pattern within the at least one generated sketch.

* * * * *